D. C. SMITH & W. F. GORTON.
RIM FOR MOTOR CAR WHEELS.
APPLICATION FILED DEC. 20, 1907.
944,514.
Patented Dec. 28, 1909.
2 SHEETS—SHEET 1.
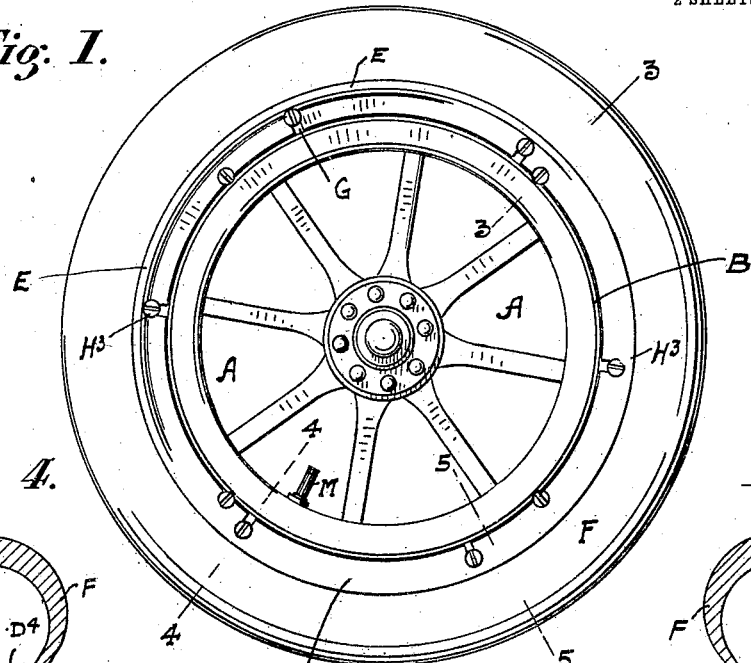
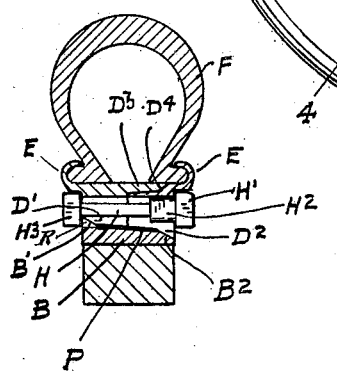
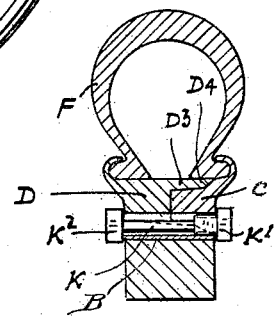
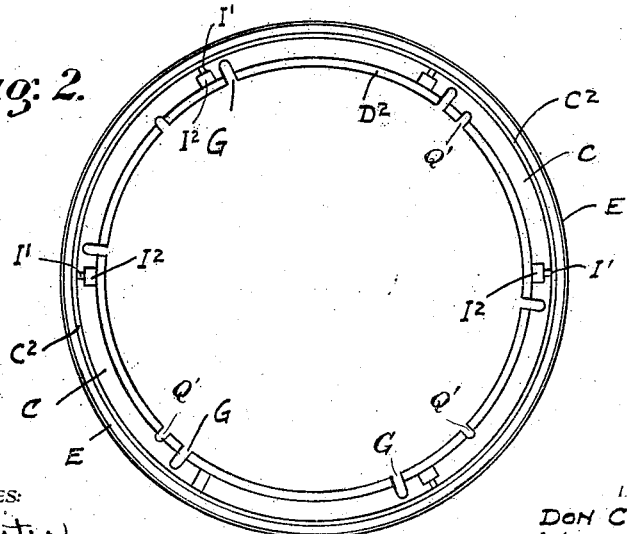
WITNESSES:
Ethel L. Lister.
George R. Jones
INVENTORS.
DON CARL SMITH.
WILLIAM F. GORTON.
BY
Thomas L. Ryan
ATTORNEY D. C. SMITH & W. F. GORTON.
RIM FOR MOTOR CAR WHEELS.
APPLICATION FILED DEC. 20, 1907.
944,514.
Patented Dec. 28, 1909.
2 SHEETS—SHEET 2.
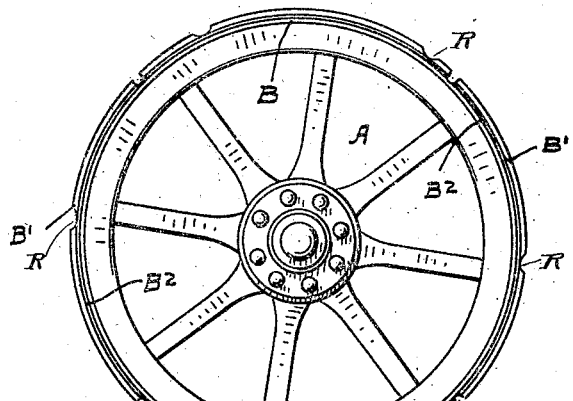
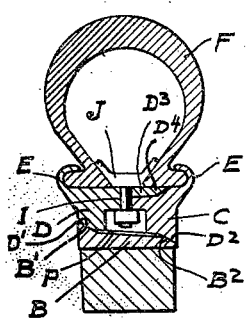
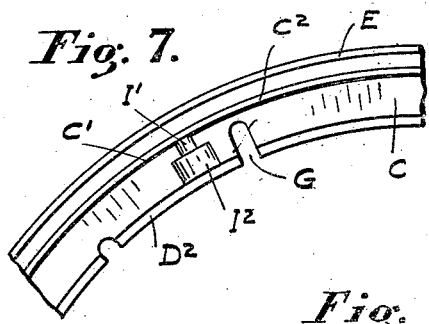
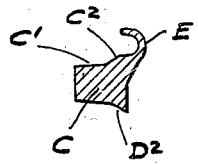
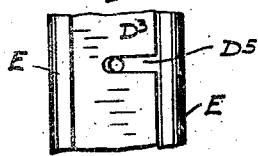
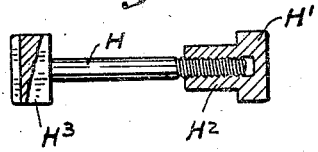
WITNESSES:
Ethel L. Lister.
George R. Jones.
INVENTORS.
DON CARL SMITH.
WILLIAM F. GORTON.
BY Thomas L. Ryan
ATTORNEY

UNITED STATES PATENT OFFICE.

DON CARL SMITH AND WILLIAM F. GORTON, OF MUNCIE, INDIANA.

RIM FOR MOTOR-CAR WHEELS.

944,514.  Specification of Letters Patent.  Patented Dec. 28, 1909.

Application filed December 20, 1907. Serial No. 407,387.

*To all whom it may concern:*

Be it known that we, DON CARL SMITH and WILLIAM F. GORTON, citizens of the United States, residing at Muncie, in the county of Delaware and State of Indiana, have invented a new and useful Rim for Motor-Car Wheels, of which the following is a specification.

Our invention relates to improvements in tires for vehicle wheels and has especial reference to devices for detachably fastening to motor-car wheels the flexible tires therefor.

While our invention will be shown herein as especially applicable to pneumatic tires, it will be understood that it is of equal utility where the solid or cushion tire is used.

Many devices and divers forms of construction of varying degrees of effectiveness are now in use whereby the flexible tire is detachably secured to the rim especially adapted therefor, the rim in turn being rigidly secured to the felly. By the means hitherto in use the attachment of the tire to and the detachment from the rim is accomplished with more or less facility, depending upon the construction and adaptation of the rim, there being some wherein the rim is provided with detachable edges retained apart and strained toward each other so as to retain the clencher form of tire, and others with angular or flaring detachable edges adapted to hold the ordinary tire base or shoe in true transverse position, the tire itself depending for its hold upon the rim, upon an endless cable embedded therein, or upon other independent holding means. Various devices for drawing down and for forcing together and securing these detachable edges or rings have been devised, such as turn-buckles, floating rings, bands, and special tools. The difficulty remains however that notwithstanding all of these devices so used, a tire cannot be attached to the wheel provided with such rims and contrivances, without the necessity of the manipulation by a mechanic or at least a person of more than ordinary skill and ingenuity, of unwieldy bands, rings, and tightening devices, and special tools for prying and forcing the tire. Moreover the tire must be in deflated condition when attached to or detached from the wheel and the prying and forcing of it by the tools and devices and tools necessary and incident to its manipulation are injurious, not only to the tire, but to the rim, and much valuable time is frequently required in the work of detaching a disabled tire from and the replacing on the wheel of a new one.

The purposes of our invention are to overcome these faults and it accordingly has for its object to provide means whereby the pneumatic tire may be maintained at all times inflated and available for immediate use, and may be by a person of ordinary skill easily and speedily attached to and as easily and quickly detached from the wheel.

Another object of our invention is to afford facility whereby the tire may be completely and more speedily and easily detached to and removed from the rim than is possible by present means in use, and without injury or damage to the tire.

A still further object is to provide a rim of this character which will be of great durability, of few parts, simple in form and economical of manufacture.

The objects thus set forth and other objects which will become apparent as the specification of our invention is disclosed, are accomplished by the device and construction described and illustrated in the accompanying specification and drawings, and defined in the subjoined claims.

Similar characters of reference refer to similar parts throughout the several views, in which—

Figure 1 is a side view of a wheel fitted with our improved rim complete. Fig. 2 is a side view of the right-half section of the tire-rim. Fig. 3 is a transverse sectional view taken on the line 3—3 Fig. 1. Fig. 4 is a transverse sectional view taken on the line 4—4 Fig. 1. Fig. 5 is a transverse sectional view taken on the line 5—5 Fig. 1. Fig. 6 is a side view of the wheel the tire and its retaining rim having been detached therefrom. Fig. 7 shows an enlarged view of a portion of the right-half section of the tire-rim, and Fig. 8 is a transverse sectional view thereof. Fig. 9 is a view of one of the bolts removed, and Fig. 10 is a plan view of a portion of the tire-rim.

A designates an ordinary substantially constructed wooden wheel having the rigidly secured felly-rim B machined true throughout the extent of its face, slightly beveled, and having the beveled edges $B^1$ and $B^2$ arranged to perform the function hereinafter referred to. The tire-rim is composed of two annularly formed members machined and finished so that the inner faces thereof will fit correctly each to the other.

C designates the right-half section, and D the left-half section, the former being provided with the slightly inclined rabbet $C^1$ and the latter with the shoulder $D^3$ whereby a close and substantial jointure of the two sections is obtained, the edge $D^4$ of the shoulder $D^3$ is angular so that any tendency of the shoulder to adhere to the beveled face of the section C is overcome. The seat $C^1$ of the rabbet and bottom of the shoulder $D^3$ are correspondingly beveled so that the placing together and taking apart of the members is rendered easy. It will be readily seen that by making the rim thus separable the difficulty and fault in rims as now made where divers contrivances are employed at the edges thereof so that the tire may be slipped off without stretching or forcing, is at once overcome. The members C and D are provided with the inturned flanges E and are transversely beveled on their bottom faces so as to register with the beveled face of the felly-rim B, sufficient clearance being provided, as will be presently referred to. The line of the bevel is broken so as to provide the angular faces $D^1$ and $D^2$ which will register with the corresponding faces $B^1$ and $B^2$ of the felly-rim B. We have necessarily shown the flanges E as being inturned; it is obvious that for the accommodation of tires of a type other than the clencher, these edges or flanges may be angular or flaring the function thereof being to prevent the tire from escaping from the rim.

The shoulder $D^3$ and its beveled edge $D^4$ besides being so provided and as of such form as to afford ease in making a true jointure of the sections C and D is of such extent transversely as to bring the interior line of jointure of the sections well away from the center, thereby preventing the possibility, when the sections are secured together of pinching or mutilating the inner-tube; and making possible the insertion, in proper position with reference to the lugs, of the inner-tube, which will reside in the flexible case F. This is an important feature of our invention, as, by reason of the prying, stretching, wrenching and manipulation of the case necessary in securing it to rims as hitherto devised, the plain view of the inner-tire being obstructed, it is often wedged out of true position, notwithstanding the most careful manipulation of the same, in such obscured position, by the hand of the manipulator.

G designates suitable transverse grooves provided in the sections C and D at intervals so as to correctly register each with the other, the function whereof is to facilitate the insertion of the bolts H whereby the two rim sections are held together; the edges immediately about the arch of these grooves are counter-sunk so that as the bolts are tightened they will readily be locked into their correct positions in the arch of the grooves. While we have shown the groove and bolt as the method for securing these sections together we do not desire to be thus limited, as other means whereby these sections may be easily secured together and as easily separated could be employed without departing in the least from the nature or principle of our invention. The preferred form of device for securing together these rim-members, consists of the bolt H threaded to fit the head $H^1$ which has the flat shank $H^2$ of width proper to snugly fit the slot G, the head $H^3$ is provided with a slot for application of a screw-driver, and the head $H^1$ is plain. The head $H^3$ may be made square or hexagonal, to be manipulated by a wrench. The heads of these bolts, so formed are neat in appearance, and such ample area for the threads is provided that a strong and rigid connection is secured; moreover dirt and moisture is prevented from coming into contact with the threads.

Provided at suitable locations in the tire-rim are the radially disposed holes I enlarged into the aperture $I^2$ and which holes I are formed by the semicircular openings $I^1$ which register with each other when the members C and D are brought together. In these holes I reside the shanks of the lugs J the function of which lugs is to grip and retain in position the lips of the flexible tire or case. The shanks of the lugs J are of the usual angular form in cross-section immediately underneath the lug. The description of this lug is merely incidental in that we have shown our invention as applicable to the use of the clencher form of tire, and we lay no claim to this detail.

Extending transversely across the shoulder $D^3$ are the slots $D^5$ (as shown in Fig. 10) which are immediately over the semicircular openings $I^1$ so that the shoulder $D^3$ in addition to the functions performed by it as heretofore set forth, performs the additional function of affording means for the retaining loosely and against rotation, and independently in their proper positions, these lugs, preparatory to their being tightened into operative position. This feature is of great utility and will be hereinafter referred to.

The aperture $I^2$ forms a suitable space for the manipulation of the tightening-nut of the shank. Besides the advantage thus obtained, of rendering unnecessary the shank of length sufficient to extend completely through the felly, we afford herein a closed aperture thereby preventing the entry into the case of foreign substances such as dust and dirt. At the place where it is necessary for the valve stem through which the air is supplied to the inner-tube, to protrude, a radially disposed hole therefor is simply bored through the felly-rim and felly.

From this description of the construction of our improved rim the mode of manipulation and use will be readily apparent. The bead of the case F is first laid into the flange E, the lugs are then introduced into the slots D³ provided in the shoulder D³ and there loosely retained; the member C is then placed in position the beveled shoulder D⁸ and its beveled edge D⁴ readily coming to rest on the beveled rabbet C¹ and the beveled surface C², the grooves G and apertures I¹ coming into true registration, and the opposite flange of the rim engaging the other bead of the case. The inner-tube will not have been disturbed in the least by this operation of fitting the case F to the rim. The bolts H are then quickly and easily slipped into the grooves G and the heads then tightened bringing the members of the tire-rim into snug contact. The operation of securing the tire immovably thereto is then easily completed by the tightening of the lugs. It will be obvious that where the flanges of the rim are of a shape to accommodate a form of tire other than the clencher, the lugs will be dispensed with. This however in no way affects the operation, application or use of our invention with tires of form other than the clencher type. The tire being thus secured in the rim, may be then inflated and so maintained in readiness for the application at any time to the wheel. M designates the flexible air-valve tube adapted to pass through a suitable opening provided therefor in the tire-rim, felly-rim and felly.

At proper intervals about the felly-rim upon its face and at the line of jointure of the tire-rim therewith, are provided suitable transversely extending openings Q disposed at a right angle thereto, which are plainly shown in Fig. 3 and Fig. 6, and which said openings form semi-circular channels across the felly-rim. Q¹ Q¹ designate grooves provided in the interior face of the tire-rim, and which grooves will register with the openings Q. Adapted to pass through the apertures formed by these meeting openings Q and grooves Q¹ are the bolts K threaded to fit the heads K² provided with a slot for the application of a screw-driver, and the head K¹ which is plain.

In applying the tire-rim to the wheel it is simply slipped onto the beveled felly-rim B as shown in Figs. 4 and 5 the heads H³ of the bolts H will pass through the transverse openings R of the beveled edge B¹ and the beveled edge D¹ and D² will come to rest in correct position on the beveled edges B¹ and B² of the felly-rim. The measure of the diameter of the face of the felly-rim, and that of the corresponding internal face of the tire-rim is such that the clearance P is provided, so that the sole bearing surfaces of the tire-rim on the felly-rim are the beveled edges B¹ and B², D¹ and D². This arrangement is a great improvement over a straight unbroken line of contact between the tire-rim and the felly-rim; and the placement and displacement of the tire-rim, after the bolts K are removed, is rendered exceedingly easy, moreover a water and a dirt tight joint is obtained, and any tendency of the tire-rim to adhere abnormally to the felly-rim, is completely overcome. The bolts K are then inserted, and as the heads K² are tightened the tire-rim will be drawn into rigid and secure contact with the felly-rim and there retained. The bolts K thus become embedded on the contacting surfaces of these rims and afford a jointure of great solidity.

Our device is of especial utility for use and application to the wheels of motor-cars or automobiles, and especially those of the greatest weight and intended for the longest runs and highest speed. One of the most frequent sources of breakage and loss of time in the performance of the class of vehicles, is the lack of means and facility whereby, when a tire is damaged or punctured or from any cause rendered ineffective, the injury or difficulty may be quickly and effectually remedied. Even if an additional tire is carried by the machine, as is now generally the case in long runs or speed trials, the difficulty arising from a disabled tire is only partially remedied since the disabled tire has to be detached from the rim by prying and forcing and the manipulation of rings, flanges and contrivances, and the new tire in deflated condition has to be applied to the wheel in like manner, in which operation a great deal of time is necessarily consumed, and the case and inner-tube are always more or less strained, mutilated and damaged, and moreover the latter has then to be inflated.

In addition to the ease and facility afforded in our device for securing on and taking the tire from the wheel, we accomplish a tire which may be kept and retained when not actually in action, in an inflated condition in readiness for immediate use; hence, in case of failure of a tire which is in use, the extra tire carried ready-inflated, may be immediately available. The utility of our invention in this reference will be especially appreciated, when it is realized that the passing of time has to be seriously reckoned with in touring and speed performances of the motor-car or automobile. To make the change, the bolts K are removed, the tire-rim is easily pushed free from the felly-rim by the hand of the manipulator and the "extra" tire fitted with our improved rim is quickly and easily slipped into position on the felly-rim in the place of its predecessor, the bolts K are then replaced and tightened and the machine is in readiness to proceed on a sound and inflated tire.

If it is desired to mend or repair the disabled tire just removed, the lugs J are first loosened, then the bolts H are loosened and easily by hand moved free from the slots G; the member C is then easily lifted from the opposite member and from the case; the inner-tube as well as the case may then be easily removed.

The mode of replacing the tire complete in the rim is obvious. The repaired tire may be then inflated and retained and carried as an "extra" in its inflated and tested and dependable condition in readiness to be applied in the same manner as just described.

What we claim as our invention, and desire to secure by Letters Patent of the United States, is—

1. In a wheel, the combination of the felly rim having its face beveled transversely, one of the edges of said beveled face being inclined upwardly and the other downwardly, a tire retaining rim composed of a pair of oppositely disposed rings their inner sides being transversely grooved to receive bolts for securing the sections together their vertical facing edges being provided with a rabbet joint having the ledge $D^3$ its internal face being so formed as to register with the beveled face and its edge inclined or beveled to register with the inclined edge of the felly rim, the said ledge being provided with radially disposed slots at proper intervals opening into semicircular recesses provided correspondingly in the face of each of said sections; the inner surface of the said tire-rim being so formed as to register with and to stand slightly apart from the beveled face, and to reside in contact with the upwardly and downwardly inclined edges of the felly rim, transverse grooves at suitable intervals to register with the corresponding grooves in the felly rim for the reception of means for securing the tire rim to the wheel, substantially as described.

2. In a wheel, the combination of the felly rim having its face beveled transversely one of the edges of said beveled face being inclined upwardly and the other downwardly, a tire retaining rim composed of a pair of oppositely disposed rings their inner sides being transversely grooved to receive bolts for securing the sections together their vertical facing edges being provided with a rabbet joint having the ledge $D^3$ its internal face being so formed as to register with the beveled face and its edge inclined or beveled to register with the inclined edge of the felly rim, the said ledge being provided with radially disposed slots at proper intervals opening into semicircular recesses provided correspondingly in the face of each of said sections; the inner surface of the said tire rim being so formed as to register with and to stand slightly apart from the beveled face and to reside in contact with the upwardly and downwardly inclined edges of the felly rim, transverse grooves at suitable intervals to register with the corresponding grooves in the felly rim for the reception of means for securing the tire rim to the wheel, countersunk bolts to connect the retaining rim sections together, and to secure the retaining rim to the tire rim, substantially as described.

3. In a wheel, the combination of a felly rim having its face beveled transversely one of the edges of said beveled face being inclined upwardly and the other downwardly, a tire retaining rim composed of a pair of oppositely disposed rings, their inner sides being transversely grooved to receive bolts for securing the sections together, their vertical facing edges being provided with a rabbet joint having a transverse ledge that has its internal face of form to register with the beveled face and its edge beveled to register with the beveled edge of the felly rim, the inner surface of the said tire retaining rim being so formed as to register with and to stand slightly apart from the beveled face, and to reside in contact with the upwardly and downwardly inclined edges of the felly rim, transverse grooves at suitable intervals to register with the corresponding grooves in the felly rim for the reception of means for securing the tire rim to the wheel, substantially as described.

In testimony whereof we sign our names to this specification in the presence of two subscribing witnesses.

DON CARL SMITH.
WILLIAM F. GORTON.

Witnesses:
EDWARD G. CLARKE,
THOMAS L. RYAN.